(12) United States Patent
Kumai (10) Patent No.: US 7,128,425 B2
(45) Date of Patent: Oct. 31, 2006

(54) PROJECTOR

(75) Inventor: Katsunori Kumai, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/897,658

(22) Filed: Jul. 22, 2004

(65) Prior Publication Data

US 2005/0024594 A1 Feb. 3, 2005

(30) Foreign Application Priority Data

Jul. 24, 2003 (JP) .............................. 2003-278884

(51) Int. Cl.
*G03B 21/28* (2006.01)
(52) U.S. Cl. ........................... 353/119; 353/98; 348/771
(58) Field of Classification Search .................. 353/98, 353/31, 37, 99, 119, 122; 348/742, 743, 348/771
See application file for complete search history.

(56) References Cited

U.S. PATENT DOCUMENTS

| 5,453,803 | A |   | 9/1995 | Shapiro et al. |
| 5,639,152 | A | * | 6/1997 | Nelson ........................ 353/119 |
| 6,099,128 | A | * | 8/2000 | Jessl ............................ 353/51 |
| 6,190,015 | B1 |   | 2/2001 | Tsai et al. |
| 6,231,191 | B1 | * | 5/2001 | Shiraishi et al. .............. 353/61 |
| 6,652,104 | B1 | * | 11/2003 | Nishida et al. ................ 353/70 |
| 6,665,048 | B1 | * | 12/2003 | Gelbart ......................... 355/47 |
| 6,726,332 | B1 | * | 4/2004 | Cannon et al. ............... 353/33 |
| 6,929,370 | B1 | * | 8/2005 | Kobayashi et al. ........... 353/99 |
| 6,935,752 | B1 | * | 8/2005 | Jeon ............................. 353/99 |
| 2002/0024637 | A1 |   | 2/2002 | Davis et al. |
| 2002/0180939 | A1 |   | 12/2002 | Miyata et al. |
| 2005/0002001 | A1 | * | 1/2005 | Yoon ........................... 353/119 |
| 2005/0030494 | A1 | * | 2/2005 | Kumai ........................ 353/119 |

FOREIGN PATENT DOCUMENTS

WO WO 01/33865 5/2001

* cited by examiner

*Primary Examiner*—William C. Dowling
(74) *Attorney, Agent, or Firm*—Volpe and Koenig, P.C.

(57) ABSTRACT

A projector comprises a light source, an optical system for illumination, a reflective light modulating device having a plurality of reflective elements arranged in matrix form to be illuminated by the light emitted from the optical system for illumination, and an optical system for projection. The optical system for projection includes a reflective surface configured to bend a projection chief ray reflected at the center of the reflective light modulating device among projection chief rays in the optical system for projection. The reflective surface has a predetermined angle to the ray which is emitted from the optical system for illumination and which strikes the center of the reflective light modulating device, and includes a P shaft parallel to one of an X axis and a Y axis along which the plurality of reflective elements is arranged.

19 Claims, 6 Drawing Sheets

PROJECTOR

CROSS-REFERENCE TO RELATED APPLICATIONS

This application is based upon and claims the benefit of priority from prior Japanese Patent Application No. 2003-278884, filed Jul. 24, 2003, the entire contents of which are incorporated herein by reference.

BACKGROUND OF THE INVENTION

1. Field of the Invention

The present invention relates to a projector which projects an image to a screen.

2. Description of the Related Art

Projectors are utilized as means for a plurality of people to simultaneously share video information at, for example, small planning sessions, meetings, large conferences and seminars. That is, the projector is portable and enables all participants to simultaneously view the same material and understand its content. Thus, the projector serves in achieving efficient meetings and sessions or convincing presentations.

Since projectors have not heretofore been light enough to carry with ease, they have only been moved between rooms in the same building and have lacked portability. However, electronic devices have recently been reduced in size and weight along with, for example, development in integrated technology of the electronic devices, so that portable projectors are also being realized owing to the size reduction.

For example, US 2002/0024637 A1 proposes a projector in which a digital micromirror device (DMD: a registered trademark of Texas Instruments, Inc., of the United States) is used as a light modulating device.

Herein, the DMD is a device in which a reflective surface is configured by a plurality of square micromirrors arranged in a matrix. Each micromirror has a diagonal pivot shaft, that is a pivot shaft with an inclination of 45 degrees with respect to an arranging direction of the mirror, and is configured to change its direction depending on whether it is turned on or off. In other words, if illumination light and reflected light are arranged to enter/exit along a plane which is perpendicular to the pivot shaft of the micromirror, the reflected light is emitted in a different direction depending on whether the mirror is turned off (off position) or on (on position). Thus, a projection lens is disposed, for example, in a direction in which the reflected light is projected when the mirror is turned on such that the reflected light can be projected on a screen. Therefore, each of the micromirrors of such a DMD is adapted to correspond to a pixel, and each micromirror is turned on/off in accordance with a value of each pixel of an input image, thereby making it possible to configure a projector which projects an image corresponding to the input image.

The projector disclosed in US 2002/0024637 A1 described above has the following configuration. Light emitted from a light source is led to an optical system for illumination via an integrator rod. The light emitted from the optical system for illumination has its light path bent by a total internal reflection (TIR) prism, and enters, as the illumination light, the DMD disposed on a DMD substrate. The reflected light (ON light) reflected by the DMD passes through the TIR prism and is projected to the screen by an optical system for projection.

It is to be noted that because the pivot shaft of each mirror of the DMD has an inclination of 45 degrees with respect to the arranging direction of the mirror as described above, the illumination light of the DMD needs to enter from a direction having an inclination of 45 degrees with respect to the arranging direction of the mirror of the DMD. Therefore, in the projector disclosed in US 2002/0024637 A1 described above, the DMD is mounted on the DMD substrate at an inclination of 45 degrees. The reason that the optical system for illumination which emits the illumination light are not inclined but the DMD is inclined as described above is to enable the projector to be stored in a small thin case. However, if the DMD is disposed with an inclination of 45 degrees as described above, the image projected to the screen is inclined at 45 degrees. Thus, in US 2002/0024637 A1 described above, a projection unit storing such a configuration is mounted on a projector base so that it can pivot 45 degrees on a rotation hinge around a shaft vertical to the DMD. In other words, during projection, the projection unit is inclined at 45 degrees so that an erect projection image is projected on the screen.

Furthermore, US 2002/0180939 A1 discloses a projector having the following configuration of an optical system. That is, light emitted from a light source is condensed to an integrator rod via a color wheel. The light emitted from the integrator rod is led to a TIR prism by a plurality of mirrors, and is totally reflected by the TIR prism to illuminate the DMD. Thus, the DMD is illuminated from a required direction with a required incidence angle. The illumination light thus illuminating is then reflected by the DMD to perform light modulation. The light which has passed through the TIR prism after the light modulation is projected to a screen by an optical system for projection.

Thus, the optical system for illumination uses a plurality of mirrors so that normal projection can be performed without disposing the DMD with inclination.

BRIEF SUMMARY OF THE INVENTION

According to an aspect of the present invention, there is provided a projector comprising:

a light source configured to emit light;

an optical system for illumination configured so that the light emitted from the light source strikes thereon;

a reflective light modulating device having a plurality of reflective elements arranged in matrix form to be illuminated by the light emitted from the optical system for illumination; and an optical system for projection configured to project the illumination light reflected by the reflective light modulating device, the optical system for projection including a reflective surface configured to bend a projection chief ray reflected at the center of the reflective light modulating device among projection chief rays in the optical system for projection, and the reflective surface having a predetermined angle to the ray which is emitted from the optical system for illumination and which strikes the center of the reflective light modulating device, and including a P shaft parallel to one of an X axis and a Y axis along which the plurality of reflective elements is arranged.

According to an another aspect of the present invention, there is provided a projector comprising:

light source means for emitting light;

optical means for illumination on which the light emitted from the light source means strikes;

reflective light modulating means constituting a reflective surface with a plurality of reflective elements arranged in matrix form to be illuminated by the light emitted from the optical means for illumination; and optical means for projection for projecting the illumination light reflected by the reflective light modulating means, the optical means for projection including a reflective means for bending a projection chief ray reflected at the center of the reflective light modulating means among projection chief rays in the optical means for projection, and the reflective means having a predetermined angle to the ray which is emitted from the optical means for illumination and which strikes the center of the reflective light modulating means, and including a P shaft parallel to one of an X axis and a Y axis along which the plurality of reflective elements is arranged.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

[First Embodiment]

In a projector according to the present embodiment, as shown in FIG. 1 to FIG. 3B, there are arranged in a case 24 a light source 10, an integrator rod 12, an optical system for illumination 14, a TIR prism 16, a DMD substrate 18, a DMD 20, and an optical system for projection 22, as in US 2002/0024637 A1 described above. That is, light emitted from the light source 10 is condensed on the integrator rod 12, led to the TIR prism 16 by the optical system for illumination 14, and totally reflected by the TIR prism 16, thereby illuminating the DMD 20 disposed on the DMD substrate 18. The illumination light is then reflected by the DMD 20 to perform a light modulation, and the light which has passed through the TIR prism 16 after the light modulation is projected by the optical system for projection 22. In this case, the DMD substrate 18 which is a support base surface on which mount the DMD 20 is disposed in the projector case 24 at a position substantially parallel with a surface on which the projector is placed, for example, a surface of a top plate of a table. Further, the projector case 24 includes at least one case surface which includes an axis at an angle of about 45 degrees to both an X axis 26 and a Y axis 28 along which a plurality of micromirrors of the DMD 20 is arranged. This case surface is substantially perpendicular to the surface on which the projector case 24 is placed when the projector case 24 is placed on this surface.

In addition to such a configuration, the projector according to the present embodiment further comprises a mirror 30 which bends a projection chief ray PB reflected at the center of the DMD 20 among chief rays in the optical system for projection 22. In this case, a reflective surface of the mirror 30 has a predetermined angle to the ray which is emitted from the optical system for illumination 14 and strikes the center of the DMD 20. Moreover, the reflective surface of the mirror 30 includes a P shaft 32 parallel with any one (the X axis 26 in the illustrated example) of the X axis 26 and the Y axis 28 along which a plurality of micromirrors of the DMD 20 is arranged. In other words, the DMD 20 is mounted with an inclination in terms of planes of an entrance optical system and an exit optical system, but one shaft (P shaft 32) of the mirror 30 is adapted to the inclination of the DMD 20 such that a projection image 34 is normally projected. It should be noted that because the light emitted to an upper side of the projector case 24 is to be bent by the mirror 30, such a projection chief ray PB reflected on the reflective surface of the mirror 30 is substantially parallel to the surface on which the projector case 24 is placed. However, this mirror 30 can pivot freely on the P shaft 32. Therefore, as shown in FIG. 2C to FIG. 4, the pivoting angle, that is, the inclination of this mirror 30, can be changed to adjust the projecting direction of the projection image 34.

Figure 3A:
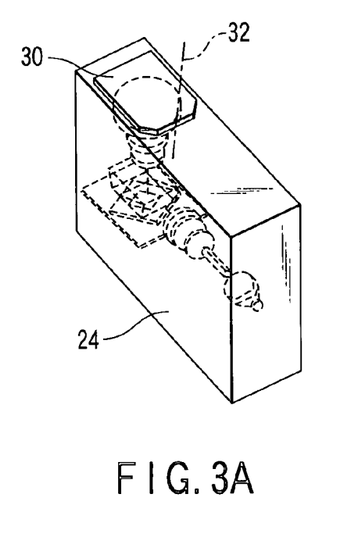
FIG. 3A is an outline perspective view of the projector which is not projecting according to the first embodiment.
Figure 3B:
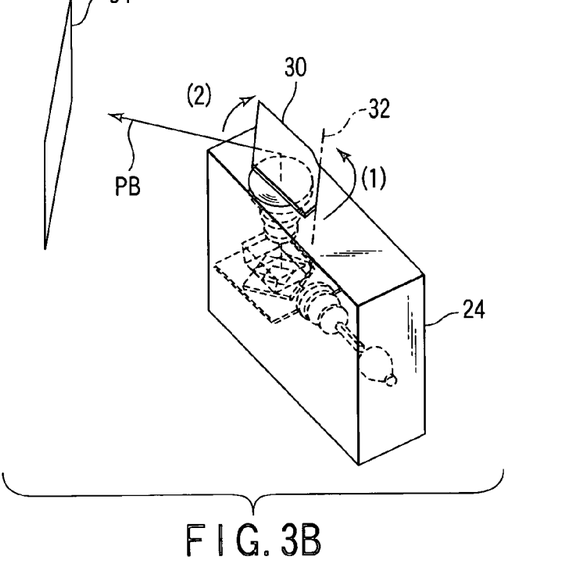
FIG. 3B is also an outline perspective view during projection.
Figure 4:
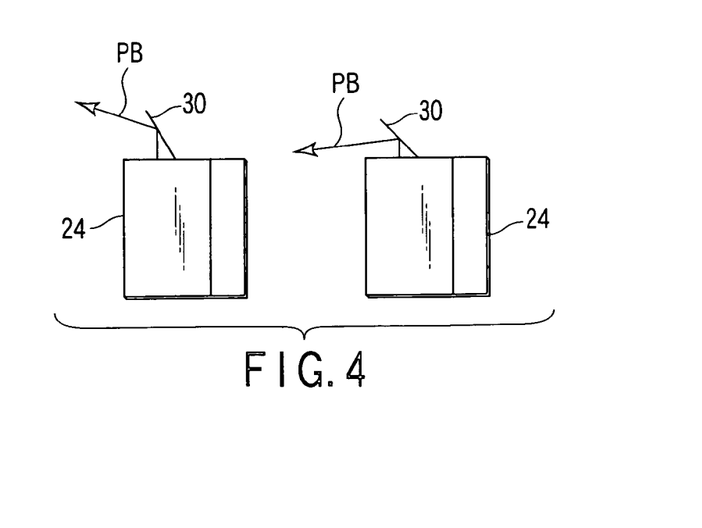
FIG. 4 is a diagram showing a relationship between pivoting angles of a mirror and projecting directions.

Furthermore, when the projector is not projecting, the reflective surface of the mirror 30 is disposed at a position substantially perpendicular to an optical axis of the optical system for projection 22 as shown in FIG. 3A, so that the mirror 30 serves as a lens cover. More specifically, the mirror 30 can serve to prevent lenses of the optical system for projection 22 from being flawed and dust from sticking to lens surfaces. It is to be noted that the mirror 30 is configured so that it can pivot 45 degrees on an axis (not shown) parallel to the optical axis of the optical system for projection 22. Therefore, in order to shift from a non-projecting state as shown in FIG. 3A to a projecting state as shown in FIG. 3B, it is necessary to (1) pivot the mirror 30 by 45 degrees around the optical axis of the optical system for projection 22 and (2) pivot the mirror 30 on the P shaft 32 to bend the projection chief ray PB. In other words, the mirror 30 is locked by an unshown lock mechanism in the non-projecting state shown in FIG. 3A to prevent the mirror 30 from improperly opening or closing. By pivoting the mirror 30 by 45 degrees around the optical axis of the optical system for projection 22, the mirror 30 is unlocked and can pivot on the P shaft 32. In addition, an angle of 45 degrees is used here because the projection image 34 is slanted and the normal projection cannot be performed if the mirror 30 is opened at a pivoting angle other than 45 degrees to perform the projection.

It should be noted that the mirror 30 has a rectangular shape, and that the P shaft 32 is designed to be perpendicular to a long-side direction of the mirror 30. With such a mirror shape, the mirror 30 does not run out of the projector case 24 when projection is not performed. The mirror shape is not naturally limited to the rectangular shape. The mirror shape may be a planar shape whose dimension in a direction perpendicular to the P shaft 32 is long enough to completely cover an image to be projected when this image is reflected on the mirror surface, and may be, for example, elliptical.

Figure 5A:
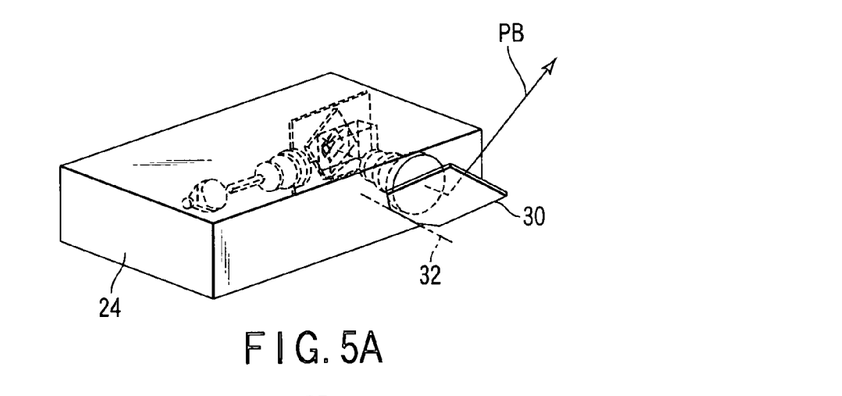
FIG. 5A is an outline perspective view of a modification of the projector during projection according to the first embodiment.
Figure 5B:
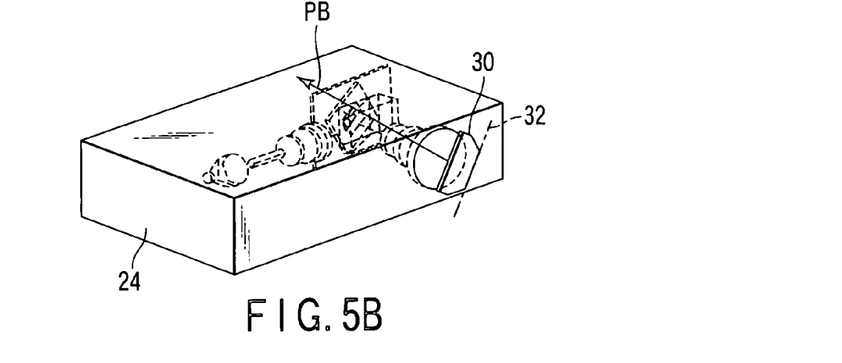
FIG. 5B is an outline perspective view in the modification of FIG. 5A during projection.

Furthermore, as shown in FIG. 5A or FIG. 5B, the support base surface for the DMD 20 of the DMD substrate 18 may be located on a surface in the projector case 24 including a line substantially parallel to a normal to a surface (generally a screen surface) on which the micromirrors of the DMD 20 by the optical system for projection 22 form an image. In this case, the projector case 24 includes at least one case surface which includes the axis at an angle of 45 degrees to both the X axis 26 and the Y axis 28 along which a plurality of micromirrors of the DMD 20 is arranged. This case surface is substantially parallel to the surface on which the projector case 24 is placed when the projector case 24 is placed on this surface.

In this configuration as shown in FIG. 5A or FIG. 5B, the projecting direction is on a slant of 45 degrees.

[Second Embodiment]

Figure 6:
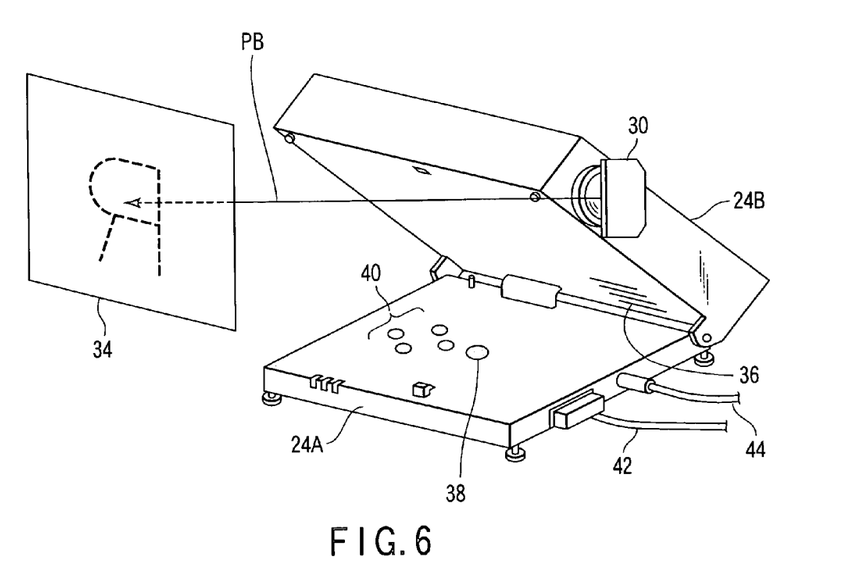
FIG. 6 is an outline perspective view of the projector during projection according to a second embodiment of the present invention.

In the projector according to the present second embodiment, the projector case 24 is configured by a projector base unit 24A and a projector main unit 24B, as shown in FIG. 6. In this case, the support base surface for the DMD 20 of the DMD substrate 18 is disposed in the projector main unit 24B at a position substantially perpendicular to the surface on which the projector is placed. The projector main unit 24B is configured pivotally with respect to the projector base unit 24A. The projector main unit 24B is fixed by an unshown lock mechanism at a position pivoted from the projector base unit 24A so that the P shaft 32 of the mirror 30 is perpendicular to the surface on which the projector is placed when the projector is projecting. This prevents the projector main unit 24B from inadvertently closing with respect to the projector base unit 24A. In this case, if a plurality of fixing positions is set or if the projector main unit 24B is configured so that it can be fixed at an optional position, the tilt angle at which the projection is performed can naturally be adjusted.

Furthermore, an inlet 36 used to release heat in the projector main unit 24B is disposed on a surface opposite to the projector base unit 24A among surfaces constituting the projector main unit 24B. This inlet 36 exposes an opening which enables suction only when the projector main unit 24B is fixed at the position pivoted from the projector base unit 24A. This can prevent the entry of dust from the inlet 36 when projection is not performed.

On the other hand, operation switches for an operator to control functions of the projector, such as a power supply button 38 to control power supply to the projector and various operation buttons 40 to adjust color and brightness, are arranged on a surface opposite to the projector main unit 24B among surfaces constituting the projector base unit 24A. These operation switches are operable only when the projector main unit 24B is fixed at the position pivoted from the projector base unit 24A. Therefore, the operation switches cannot be operated inadvertently. Moreover, as described above, the inlet 36 exposes the opening which enables suction, only when the projector main unit 24B is opened with respect to the projector base unit 24A, so that cooling can only be performed when it is opened. Hence, it is important to keep the power supply button 38 inoperable when the projector main unit 24B is not open to the projector base unit 24A.

It should be noted that a signal line 42 and a power supply line 44 are configured to be connected to a surface vertical to the surface on which the projector is placed among the surfaces constituting the projector base unit 24A. That is, if the connection lines to the outside are connected on the side of the projector main unit 24B, the projection image 34 is displaced greatly on the screen surface, for example, when a force is applied to the connection lines even though the force is small. Thus, the connection lines are connected on the side of the projector main unit 24B as described above.

Figure 7:
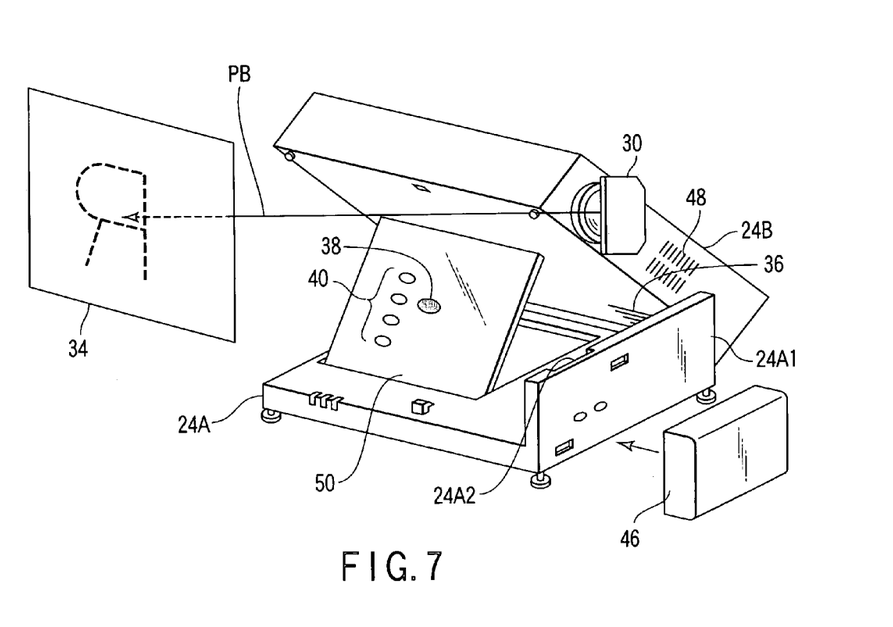
FIG. 7 is an outline perspective view of a modification of the projector during projection according to the second embodiment.

Moreover, a battery 46 can also be used instead of the power supply line 44 as shown in FIG. 7. In this case, by attaching the heavy battery 46 to the side of the projector base unit 24A, the center of gravity is lowered and stability is increased.

Furthermore, an outlet 48 used to release heat in the projector main unit 24B may be disposed on a surface opposite to a surface 24A1 to which the battery 46 of the projector base unit 24A is attached among the surfaces constituting the projector main unit 24B. This outlet 48 exposes an opening which enables air discharge only when the projector main unit 24B is fixed at the position pivoted from the projector base unit 24A. This can prevent the entry of dust from the outlet 48 when projection is not performed. It should be noted that, in this case, a depression 24A2 is provided in the surface 24A1 of the projector base unit 24A in accordance with a rise produced by the mirror 30.

Furthermore, the projector base unit 24A may also be configured in such a manner that an operation panel 50 provided with the operation switches such as the power supply button 38 and the operation buttons 40 pivots to allow easier operation and to support the opened projector main unit 24B.

[Third Embodiment]

Figure 8:
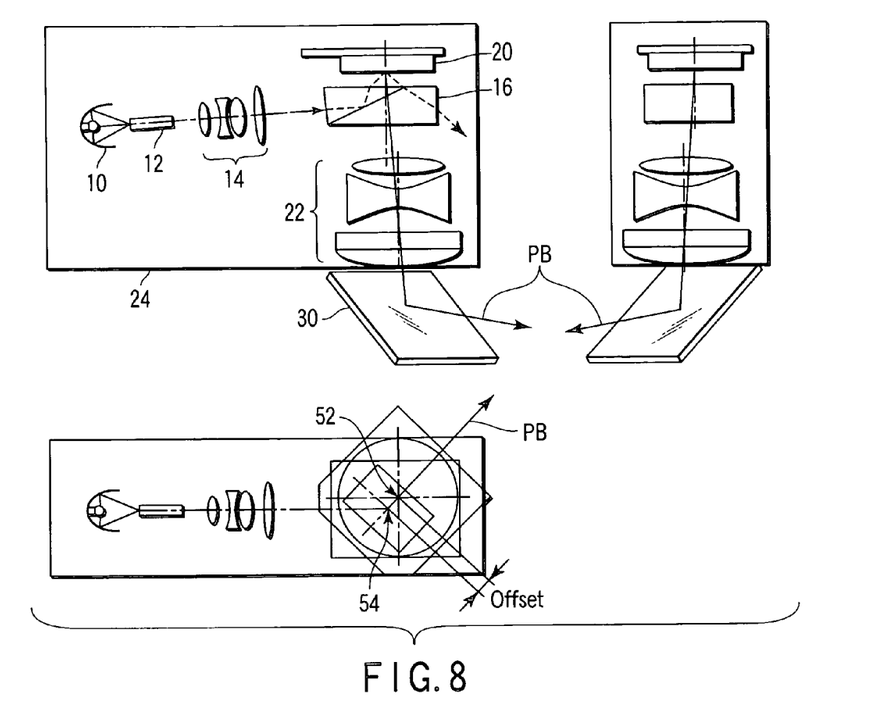
FIG. 8 is a triple view of the projector in which the optical systems are illustrated with full lines to explain an arrangement relationship of the optical systems in the projector according to a third embodiment of the present invention.

In the first and second embodiments described above, the projection chief ray PB aligns with the optical axis of the optical system for projection 22. However, as shown in FIG. 8, the DMD 20 may be disposed at a position shifted for a predetermined offset distance in a direction parallel to its micromirrors and perpendicular to the P shaft 32 so that the projection chief ray PB is inclined with respect to the optical axis of the optical system for projection 22. That is, a projection optical system central axis 52 is offset from a DMD central axis 54.

Figure 9:
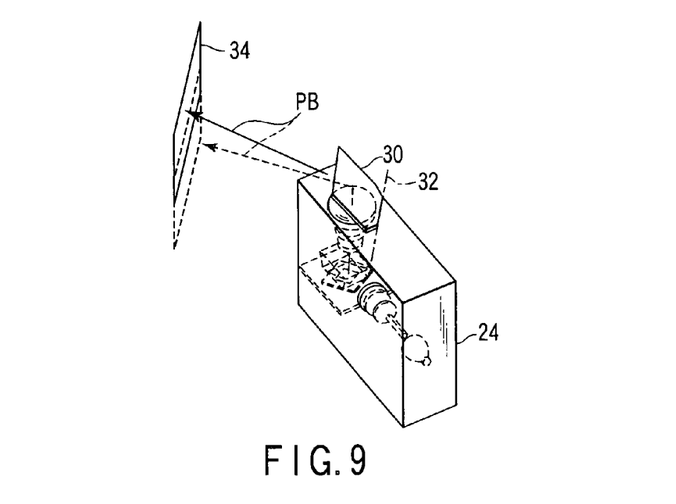
FIG. 9 is an outline perspective view of the projector during projection according to the third embodiment.

The advantage in such an offset is that the projection image 34 can be projected upward and a keystone effect is not produced as compared with a case without offset (indicated by broken lines in the diagram) as shown in FIG. 9.

[Fourth Embodiment]

In the first to third embodiments described above, the mirror 30 is disposed in the rear of the optical system for projection 22, but the present invention is not limited thereto.

Figure 10:
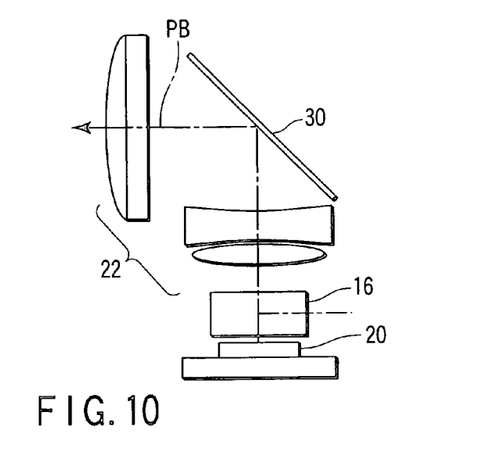
FIG. 10 is a diagram showing an arrangement relationship of the optical system for projection in the projector according to a fourth embodiment of the present invention.
Figure 11:
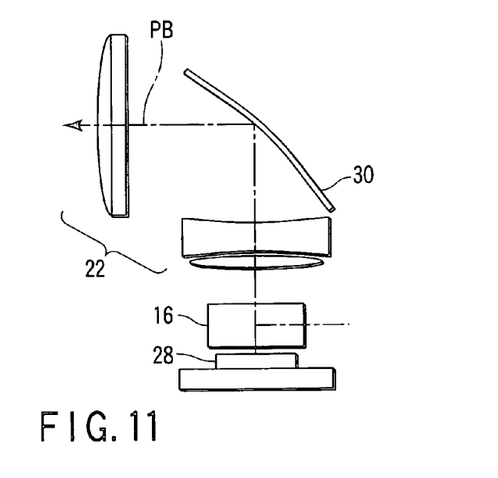
FIG. 11 is a diagram showing an arrangement relationship of a modification of the optical system for projection of the projector according to the fourth embodiment.

More specifically, the mirror 30 may be disposed within a lens group of the optical system for projection 22 as shown in FIG. 10. In this case, as shown in FIG. 11, one having a curved surface is used as the mirror 30 within such a projection lens group and may also serve as a lens.

Figure 12:
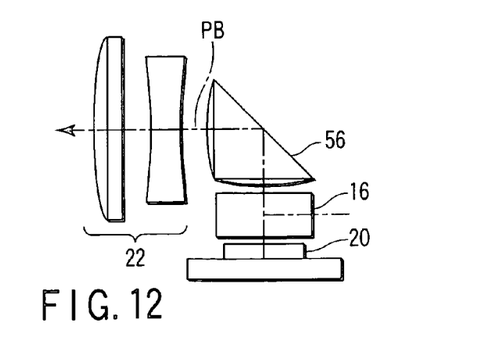
FIG. 12 is a diagram showing an arrangement relationship of another modification of the optical system for projection of the projector according to the fourth embodiment.

Alternatively, instead of using the mirror 30, a rectangular prism 56 whose entrance plane and exit plane are formed by curved surfaces to serve as lenses may be disposed between the optical system for projection 22 and the DMD 20, as shown in FIG. 12.

While the present invention has been described above in connection with the embodiments, the present invention is not limited to the embodiments described above, and various modifications and applications can naturally be made within the spirit of the present invention.

Figure 1:
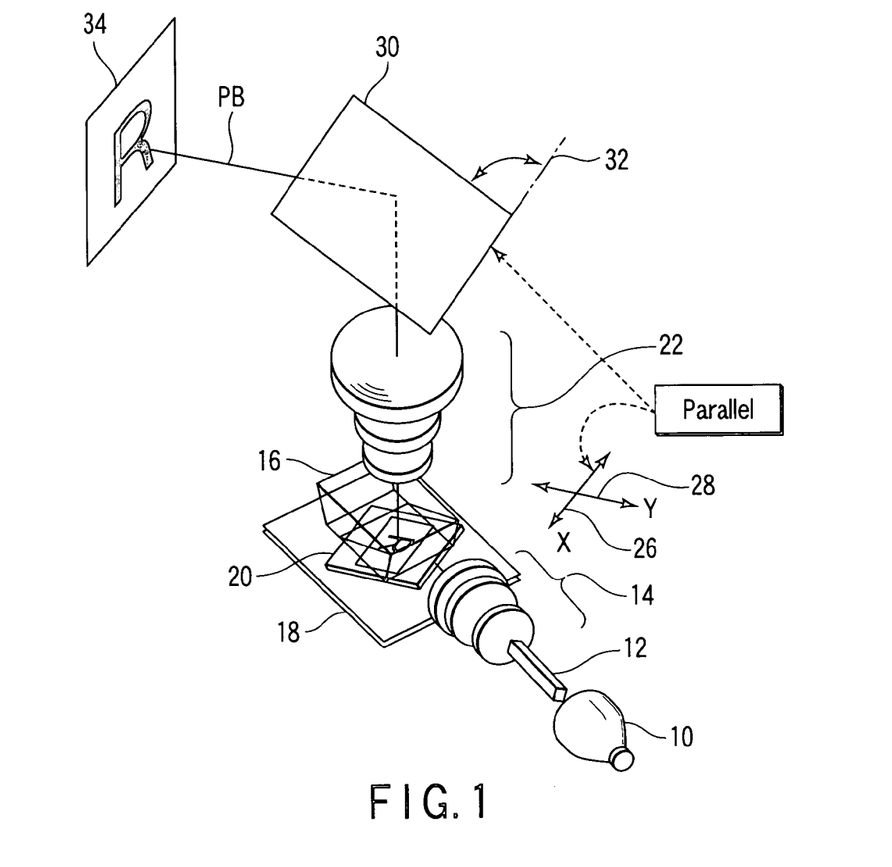
FIG. 1 is a perspective view showing a configuration of optical systems in a projector according to a first embodiment of the present invention.
Figure 2A:
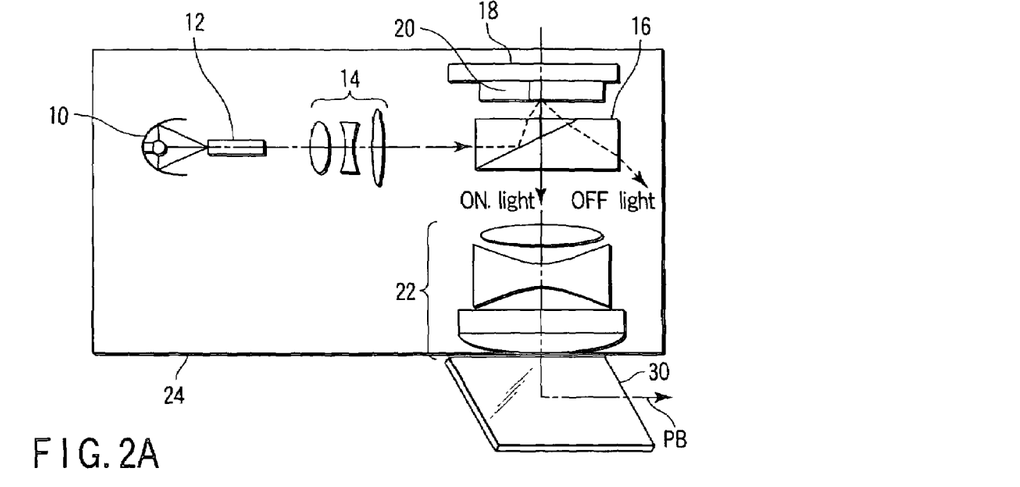
FIG. 2A is a front view of the projector in which the optical systems are illustrated with full lines to explain a planar arrangement relationship of the optical systems in the projector according to the first embodiment.
Figure 2B:
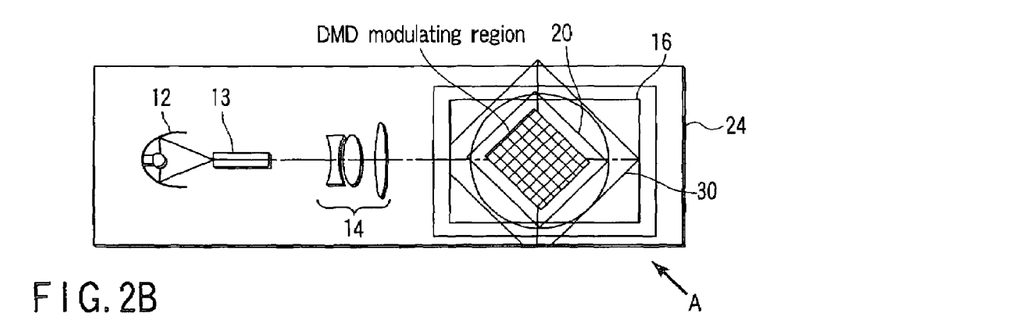
FIG. 2B is a plane view of the projector in which the optical systems are illustrated with full lines also to explain a planar arrangement relationship of the optical systems.
Figure 2C:
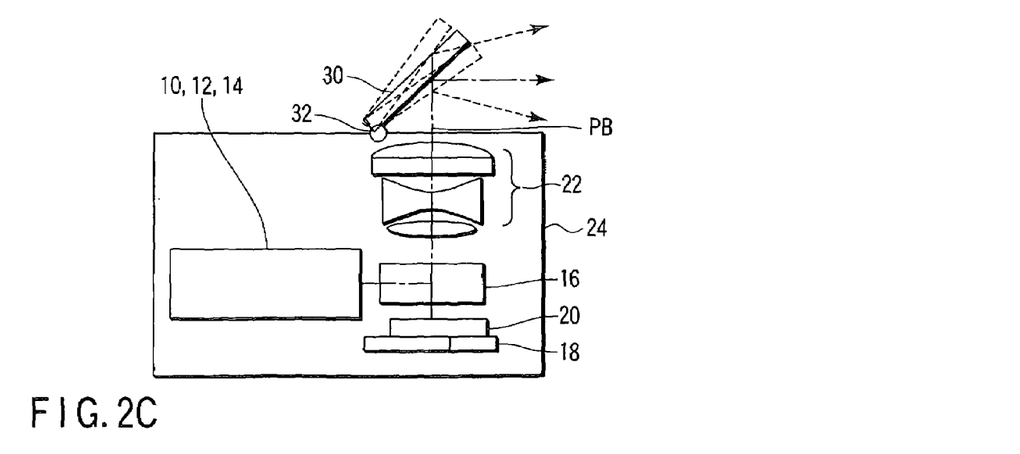
FIG. 2C is a view along an arrow A of FIG. 2B.

For example, a DMD has been used as a reflective light modulating device in the embodiments described above, but the present invention is not limited to a DMD, and other reflective light modulating devices may also be used. In particular, the present invention is suitably used for a modulating device in which the optical system for illumination has to be disposed at a slant with respect to the arranging direction (X axis 26, Y axis 28) of the modulating device (of the micromirrors in the case of a DMD) as shown in FIG. 2A to FIG. 2C.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A projector comprising:
   a light source configured to emit light;
   an optical system for illumination configured to condense the light emitted from the light source and emit the light;
   a reflective light modulating device comprising a reflective surface having a plurality of reflective elements arranged in matrix form to be selectively illuminated by the light emitted from the optical system for illumination; and
   an optical system for projection configured to project the illumination light reflected by the reflective light modulating device; and
   a case configured to house at least the optical system for illumination and the reflective light modulating device,
   the optical system for projection including a reflective surface configured to bend a given projection chief ray reflected at the center of the reflective light modulating device among projection chief rays in the optical system for projection, and
   the given projection chief ray having a predetermined angle to a ray which strikes the center of the reflective light modulating device after being emitted from the optical system for illumination,
   the reflective surface including a P shaft which is parallel to one of an X axis and a Y axis along which the plurality of reflective elements is arranged, and
   the case including a case surface which is substantially perpendicular to a plane having the X and the Y axis thereon, wherein the case surface intersects both the X and the Y axis at an angle of substantially 45 degrees.

2. The projector according to claim 1, wherein
   the optical system for projection includes a projection lens and a mirror, and
   the reflective surface is a mirror surface of the mirror.

3. The projector according to claim 2, wherein the mirror is configured pivotally on the P shaft.

4. The projector according to claim 3, wherein the mirror
   is disposed in the rear of the projection lens, and
   is disposed at a position where the mirror surface is substantially perpendicular to an optical axis of the projection lens when the projector is not projecting.

5. The projector according to claim 4, wherein
   when the projector transits from a non-projecting state to a projecting state, the mirror
      is pivoted 45 degrees on a shaft parallel to the optical axis of the optical system for projection, and then
      is pivoted on the P shaft to bend the projection chief ray, and the P shaft
      is at an angle of 45 degrees to both the X axis and the Y axis when the projector is in the non-projecting state, and
      is at an angle of 90 degrees to one of the X axis and the Y axis when the projector is in the projecting state.

6. The projector according to claim 5, wherein
   the mirror has a rectangular shape, and
   the P shaft is perpendicular to a long-side direction of the mirror.

7. The projector according to claim 2, wherein
   a support base surface of the reflective light modulating device is disposed in a projector case at a position substantially parallel to a surface on which the projector is placed, and
   the projection chief ray reflected on the mirror surface is substantially parallel to the surface on which the projector is placed.

8. The projector according to claim 2, wherein a support base surface of the reflective light modulating device is disposed on a surface including a line substantially parallel to a normal to a surface on which the reflective elements of the reflective light modulating device by the optical system for projection form an image.

9. The projector according to claim 2, wherein
   a case of the projector includes a projector base unit and a projector main unit,
   a support base surface of the reflective light modulating device is disposed in the projector main unit at a position substantially perpendicular to the surface on which the projector is placed, the projector main unit is configured pivotally with respect to the projector base unit, and the projector main unit is fixed at a position pivoted from the projector base unit so that the P shaft is perpendicular to the surface on which the projector is placed when the projector is projecting.

10. The projector according to claim 9, further comprising:

operation switches which are arranged on a surface opposite to the projector main unit among surfaces configuring the projector base unit and which are configured to be operated by an operator to control functions of the projector, the operation switches being operable only when the projector main unit is fixed at the position pivoted from the projector base unit.

11. The projector according to claim 10, wherein the operation switches include a power supply switch configured to be operated for control of power supply to the projector.

12. The projector according to claim 9, further comprising:

an inlet which is disposed on a surface opposite to the projector base unit among surfaces configuring the projector main unit and which is configured to use in heat release in the projector main unit, the inlet exposing an opening which enables suction only when the projector main unit is fixed at the position pivoted from the projector base unit.

13. The projector according to claim 9, further comprising:

an outlet which is disposed on a surface opposite to the projector base unit among surfaces configuring the projector main unit and which is configured to release heat in the projector main unit, the outlet exposing an opening which enables air discharge only when the projector main unit is fixed at the position pivoted from the projector base unit.

14. The projector according to claim 1, wherein
the reflective light modulating device includes a DMD, and
the plurality of reflective elements includes a plurality of micromirrors.

15. The projector according to claim 1, wherein the reflective light modulating device is disposed at a position shifted a predetermined offset distance in a direction parallel to reflective surfaces of its reflective elements and perpendicular to the P shaft so that the given projection chief ray is inclined with respect to the optical axis of the optical system for projection.

16. The projector according to claim 1, wherein the at least one case surface is substantially perpendicular to the surface to place the projector when the projector is placed on this surface.

17. The projector according to claim 1, wherein the at least one case surface is substantially parallel to the surface to place the projector when the projector is placed on this surface.

18. The projector according to claim 1, wherein the optical system for illumination comprises a transmitting member.

19. A projector comprising:

light source means for emitting light;

optical means for illumination on which the light emitted from the light source means is condensed and emitted;

reflective light modulating means comprising a reflective surface with a plurality of reflective elements arranged in matrix form to be selectively illuminated by the light emitted from the optical means for illumination;

optical means for projection for projecting the illumination light reflected by the reflective light modulating means; and a case configured to house therein at least the optical means for illumination and the reflective light modulating means, the optical means for projection including a reflective means for bending a given projection chief ray reflected at the center of the reflective light modulating means among projection chief rays in the optical means for projection, and the given projection chief ray having a predetermined angle to a ray which strikes the center of the reflective light modulating means after being emitted from the optical means for illumination, the reflective means including a P shaft which is parallel to one of an X axis and a Y axis along which the plurality of reflective elements is arranged, and the case including a case surface which is substantially perpendicular to a plane having the X and the Y axis thereon, wherein the case surface intersects both the X and the Y axis at an angle of substantially 45 degrees.

* * * * *